H. R. FRENSDORF.
FISHING TACKLE.
APPLICATION FILED NOV. 1, 1919.
1,339,189.
Patented May 4, 1920.
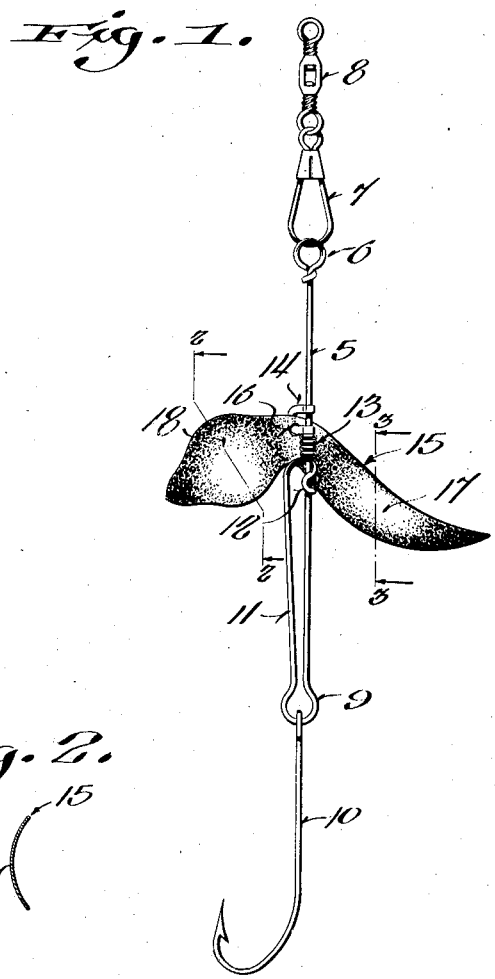
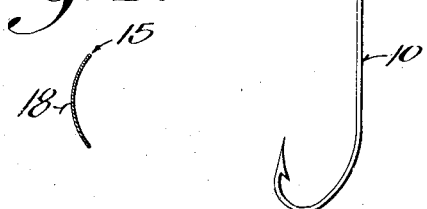
Inventor:
Herman R. Frensdorf
By Morsell + Keeney,
Attorneys

UNITED STATES PATENT OFFICE.

HERMAN R. FRENSDORF, OF GIBBS CITY, MICHIGAN.

FISHING-TACKLE.

1,339,189.  Specification of Letters Patent.  Patented May 4, 1920.

Application filed November 1, 1919. Serial No. 335,065.

*To all whom it may concern:*

Be it known that I, HERMAN R. FRENSDORF, a citizen of the United States, and resident of Gibbs City, in the county of Iron and State of Michigan, have invented new and useful Improvements in Fishing-Tackle, of which the following is a description, reference being had to the accompanying drawings, which are a part of this specification.

The present invention relates to certain new and useful improvements in fishing tackle and refers more particularly to what may be termed a trolling spinner or lure for game fish.

One object of the present invention is to provide a trolling spinner of the class described in which the vanes of the spinner are so shaped as to impart a circular movement to the tackle as it is drawn through the water.

Another object of this invention is to provide a trolling spinner which will be of compact, yet efficient construction, and which will function in a practical manner.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing I have illustrated one complete example of the physical embodiment of my invention constructed according to the best mode I have so far devised for the practical application of the principles thereof, and in which:

Figure 1 is an elevational view of a trolling spinner or lure constructed according to and embodying the various features of my invention.

Fig. 2 is a sectional view through one vane of the spinner, said view being taken on the line 2—2 of Fig. 1, and Fig. 3 is a sectional view through the other vane, said view being taken on the line 3—3 of Fig. 1.

Referring now more particularly to the accompanying drawing, the numeral 5 designates a supporting member formed of wire or the like, having a loop or eye 6 formed in one end for engagement with a detachable hook member 7 connected with a fishing line by means of a journaled joint or the like 8. The lower end of the member 5 has formed thereon an eye 9 adapted to receive a suitable fish hook 10, the eye 9 being readily detachably closed by means of the end portion 11 of the wire 5 being bent along the medial portion thereof, and having its extreme end looped, as at 12, to provide a readily releasable lock or securing means, as clearly shown in the drawings.

Freely rotatably mounted on the shank or medial portion of the wire 5 are a plurality of washers 13 and a yoke or shackle member 14. A spinner 15 is secured to the shackle member 14, as at 16, and the spinner is formed with a long, narrow vane 17, and a substantially short but wide vane 18. The vanes 17 and 18 are concave and convex on one surface, respectively, and convex and concave, respectively, on the opposite surface.

The spinner 15 is rapidly rotated as the tackle is passed through the water to lure the fish to strike the bait usually secured to the hook 10, and by reason of the peculiar shape of the spinner, the same will cause the tackle to travel in a zig-zag or circular course.

What I claim as my invention is:

1. A trolling spinner comprising a short and a long vane, said vanes extending in substantially opposite directions, one being convex and the other one concave.

2. A trolling spinner comprising a relatively long and narrow vane, and a relatively short and wide vane, one vane being convex and the other one concave.

3. A trolling spinner of the class described formed from a single sheet of material and comprising two substantially oppositely extending vanes, one of said vanes being wider than the other and having a greater resistance than the other vane in the passage of the spinner through the water, whereby a zig zag course is imparted thereto, one of said vanes being convex and the other one concave.

In testimony whereof, I affix my signature.

HERMAN R. FRENSDORF.